United States Patent

Arbuse

[15] 3,645,474
[45] Feb. 29, 1972

[54] COMBINED LAND AND AIR VEHICLE

[72] Inventor: Samuel H. Arbuse, P.O. Box 244, Palm Beach, Fla. 33480

[22] Filed: May 8, 1970

[21] Appl. No.: 35,683

[52] U.S. Cl. ............................................................244/2
[51] Int. Cl. ......................................................B64c 37/00
[58] Field of Search ...................................................244/2

[56] References Cited

UNITED STATES PATENTS

| | | | |
|---|---|---|---|
| 2,562,491 | 7/1951 | Hall | 244/2 |
| 2,593,785 | 4/1952 | Nye et al. | 244/2 |
| 2,624,530 | 1/1953 | Hanssen | 244/2 |
| 2,373,467 | 4/1945 | Frakes | 244/2 |
| 2,410,234 | 10/1946 | Read et al. | 244/2 |

Primary Examiner—Milton Buchler
Assistant Examiner—Carl A. Rutledge
Attorney—Eliot S. Gerber

[57] ABSTRACT

A combined land and air vehicle includes an automobile having an engine for travel on land and a detachable air structure. The automobile is adapted to be connected with the air structure which includes wings, tail assemblies and an airplane engine, for air travel. To become ready to fly, the steering wheel of the automobile is disconnected from the front automobile wheels and is connected with the elevator and aileron controls. A rudder-steering pedal trolley system is engaged, which has pedals that are removed when driving on land and which are connected for flying. A power transmission system permits the automobile engine to rotate the propeller in case of failure of the airplane engine.

10 Claims, 16 Drawing Figures

Patented Feb. 29, 1972

INVENTOR.
SAMUEL H. ARBUSE
BY
Eliot S. Gerber
ATTORNEY.

INVENTOR.
SAMUEL H. ARBUSE
BY
Elise S. Gerber
ATTORNEY.

Patented Feb. 29, 1972

INVENTOR.
SAMUEL H. ARBUSE
BY
Elsie S. Gerber
ATTORNEY.

COMBINED LAND AND AIR VEHICLE

The present invention relates to a combination vehicle which may be flown in the air or driven on land.

A combined land and air vehicle has numerous advantages over conventional aircraft or a conventional automobile. Anyone who has suffered in a highway traffic jam, or taken long hours on otherwise uncongested roads to reach their destination, may attest to this.

The pilot who arrives at most airports lacks for the convenience of ground transportation. A combined land and air vehicle makes for quite a different situation. Long trips are dramatically shortened in time, and ground transportation is always at hand.

If it were possible to rent only the aircraft portion and attach it to one's own modified and equipped car, many flyers would be able to vacation or travel on business with ease. They could use their car for ordinary road travel, rent the air structure to fly to another city or vacation area, and use their car for further road travel. Their actual use of the aircraft portion may be for only a few hours.

There have been various proposals for a combined flying and land vehicle, but none of these has been successful commercially. Some of these suggestions took the form of an automobile having foldable wings with a single engine. However, that type of vehicle presents great difficulties as, in many respects, the engine and control requirements for land and air travel are different. It has also been proposed that a specially constructed lightweight automobile be detachably mounted to a wing and tail assembly. In some of these suggestions, both the automobile and the wing and tail assembly had separate engines. Those suggestions, however, had two major difficulties. First, the cost of producing the special lightweight car would have made the price of such a car prohibitively high compared to the price of mass-produced automobiles. Secondly, the resulting automobile was usually not that good a machine (compared to available mass-produced cars) and a profusion of controls complicated operation.

It is the objective of the present invention to provide a combination land and air vehicle whose automobile portion is mass-produced at a relatively low cost and whose air structure portion can be produced at a competitive cost.

It is a further objective of the present invention to provide a combination land and air vehicle in which: (1) the automobile portion may be joined securely and safely to the aircraft portion and in which such joining may be accomplished rapidly and conveniently; (2) the steering wheel may be used conventionally for road travel and may also be used as a control during flying; (3) the rudder-steering trolley system will not interfere with the conventional clutch and brake pedals while driving on a road; (4) the controls and modifications required for flying will not greatly add to the cost of the automobile portion; (5) emergency power may be obtained in case of failure of the airplane engine; (6) both the automobile portion and aircraft portion will be self-supporting.

In accordance with the present invention, a combined air and land vehicle is presented. The automobile portion is a conventional mass-produced automobile having, preferably, a solid frame top which may be opened. Preferably the automobile is a 1970-to-date Volkswagen "Beetle" sedan sun roof model. The automobile is adapted to be connected to an aircraft portion including a wing, a pair of booms, two vertical stabilizer and rudder assemblies with horizontal stabilizer and elevator assembly and an aircraft engine. The complete aircraft portion is self-supporting and need only be tilted to join it to the automobile.

The steering wheel of the automobile is conventionally connected to the front wheels while driving on the road. However, when prepared for flying, the front wheel direction control is disconnected from the steering wheel and connected to a rudder-steering pedal trolley system. This enables the direction of the wheels to be controlled synchronously with the rudder, as in other airplanes and unlike other proposed combination vehicles. The steering wheel, during flying, functions as a conventional airplane control wheel and controls the wing ailerons and tail elevator.

The rudder-steering trolley system is built into the automobile portion. Its pedals are demountable so that there is not any interference with the clutch and brake pedals or foot and leg comfort while driving on the highway.

The controls necessary for flying are arranged to terminate in three horizontally movable plates at the sun roof of the automobile. In preparing for flying, the sun roof is opened and the three plates are connected with matching plates within the aircraft portion. The plates of the aircraft portion are connected to the ailerons, rudders and elevator.

A transmission is arranged, at the rear of the automobile, so that, if the aircraft engine fails, the rear engine of the automobile may be started and will rotate a shaft. That shaft is connected to overrunning clutches on the propeller shaft, so that the automobile engine or the aircraft engine can turn the propeller.

Other objectives of the present invention will be apparent from the following detailed description of the invention, the description being taken in conjunction with the accompanying drawings.

As shown in FIGS. 1–4, the combined land and flying vehicle generally comprises an automobile portion 10 and an aircraft portion 11. The aircraft portion 11 consists of a left wing 12 having aileron 13 and flap 14 and a right wing 15 having aileron 16 and flap 17, the terms "left" and "right" referring to the top view of FIG. 1. A pair of booms 18 and 19 are connected to the wing structure. The rear ends of the booms 18 and 19 are connected to a tail assembly including a horizontal stabilizer 20a and elevator 20b.

Figure 1:
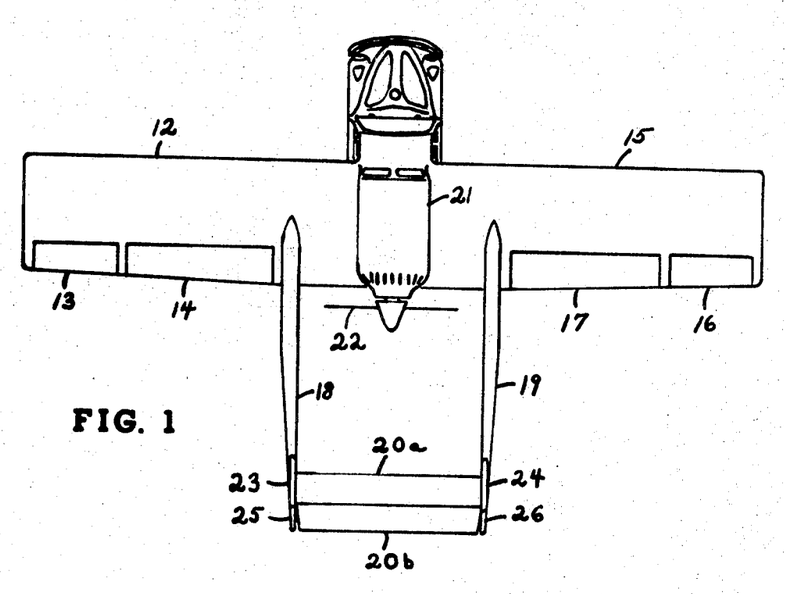
FIG. 1 is a top plan view of the combination vehicle of the present invention, ready for flying, showing the automobile portion joined to the aircraft portion.
Figure 2:
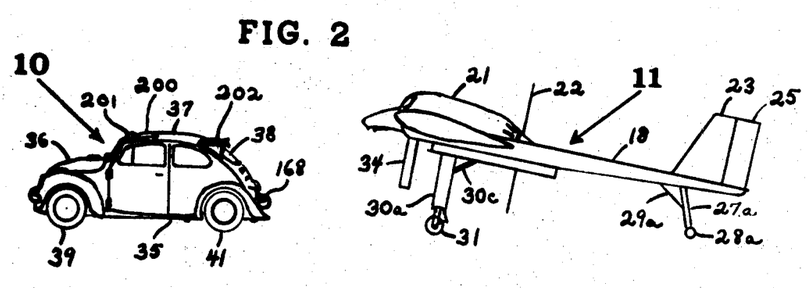
FIG. 2 is a side plan view of the combination vehicle as shown in FIG. 1, but with the portions separated.

An airplane engine cover (cowling) 21 is affixed to the wing structure and encloses an airplane engine whose output shaft is connected to and drives the propeller 22 by its connection to the propeller shaft. Preferably, the wing span should be 38 to 40 feet and the wing cord should be 6 to 7 feet, providing a wing area of about 240 square feet. The engine is an air-cooled gas-operated engine of preferably a minimum of 285 horsepower and may be normally aspirated or fuel injected. The overall length of the combined vehicle would be between 24 and 26 feet and the length of the booms 18 and 19 measured from the leading edge of the wing should be between 17 ½ and 19 ½ feet. The air structure should weigh 1,200 lbs. dry and the modified automobile should be 1,933 lbs. dry (without the emergency engine drive) so that the total structure should weigh approximately 4,500 lbs. gross, fully loaded.

The aircraft engine is located in the center of the wing and positioned as far forward as possible, so that its center of gravity would be located as close as possible over the center of gravity of the automobile portion 10.

Figure 3:
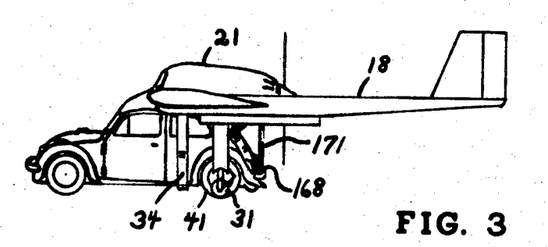
FIG. 3 is a side plan view of the vehicle as shown in FIG. 1.
Figure 4:
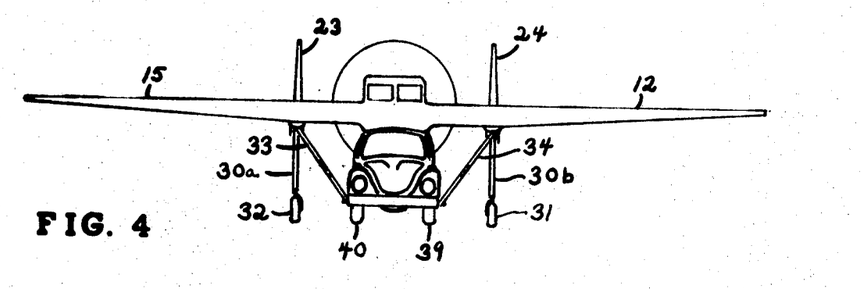
FIG. 4 is a front plan view of the combination vehicle as shown in FIG. 1.

As shown in FIGS. 1 and 3, the air structure portion includes a left vertical stabilizer 23 and a right vertical stabilizer 24 with a left tail rudder 25 and a right tail rudder 26. A pair of manually retractable rear dolly struts 27a, 27b, each having a freely rotatable swiveling wheel 28a, 28b, is connected by retracting and reinforcing members 29a, 29b and arranged to be retracted within the respective booms 18 and 19. A pair of front wheel struts 30a and 30b have on their axles freely rotatable wheels, respectively 31 and 32, comprising the main landing (and air structure support) gear (see FIGS. 4 and 3). Those wheel struts are retractable, by reinforcing and retracting struts 30c and 30d, to within their respective booms 18 and 19. A pair of extendable support struts 33 and 34 are connected between the booms and the automobile portion 10. These struts would remain attached to the air structure in this same relative position even if design or production requirements narrowed the interboom distance.

The automobile portion 10 comprises generally an automobile body 35 having a front hood 36 and a roof frame 37 having an openable top 200, i.e., a sun roof. The automobile portion also has a rear window 38, front wheels 39 and 40, and rear wheels 41 and 42.

CENTER OF GRAVITY AND CENTER OF LIFT

The wheel struts 30a and 30b, along with their wheels 31 and 32 form, in effect, along with the rear wheels 28a and 28b, a dolly structure which is self-supporting. The aircraft portion 11 will be maintained above the ground by those wheels and struts. The automobile portion 10, when removed from the air structure portion, will permit the air structure portion 11 to settle gently on its dolly gear. This is accomplished by locating the center of gravity of the air structure 11 (without the automobile portion 10) just behind the axis of the main landing gear hinge upon which the struts 30a and 30b rotate for retraction, and as close to that hinge axis as possible. When the automobile portion 10 is joined to the air structure 11 for flying, their combined center of gravity will be located about midway between the automobile's center of gravity (which is approximately at the automobile jacking ports to which the struts 33 and 34 are attached) and the rear axle of the automobile portion 10. The rear axle of the automobile is on the same frontal planar line as the axles of the landing gear struts 30a and 30b. The center of the lift is arranged to be behind the combined center of gravity by approximately one-half to 1 foot, so that the combined structure, when flying, will have a manageable forward center of gravity. The wing structure may have the underside of the wings tapered outward of the booms up towards the upper wing surface to form a wing dihedral, see FIG. 4. This particular facet of design may be modified depending upon the desired flight characteristics.

MATERIALS OF CONSTRUCTION

The automobile portion 10 is a mass-produced car to which certain controls and instruments are added. Preferably, the car is a Volkswagen sedan "Beetle" model having an openable sun roof. The Volkswagen although Volkswagen, of conventional stamped sheet steel, is still a relatively lightweight car of 1,808 lbs. It is powered by an air-cooled engine having a lightweight block. The number of modifications to the automobile are kept at a minimum to minimize costs but are fabricated to aircraft standards. The aircraft portion 11 is constructed of conventional aircraft materials. Specifically, the wing, booms, tail, landing and dolly gear and the aircraft engine are all preferably of aluminum and its alloys.

CONTROL SYSTEM

The flight instrument panel and automobile dashboard are combined within automobile portion 10. Many of the controls and instruments are the same as in conventional automobiles. For example, an AM/FM radio may be on the right side of, and below, the dashboard, the windshield wiper knob on the left side and the light switch moved to the left, leaving the center portion free for the flight instruments. The dashboard also includes the usual automobile speedometer, and a fuel gauge, etc.

The instruments required for aircraft flight are fixed on a shock mounted panel, for example, measuring at least 7 inches high by 11 inches wide. The instruments would extend to the front hood and require that the wiring harness for the automobile instruments be relocated. The aircraft instruments on the dashboard may include an altimeter, air speed indicator, gyro horizon, turn coordination gyro compass, and rate of climb meter. A magnetic compass may be located in the vicinity of the rear view mirror. The aircraft communication system, including an omninavigation system, may be positioned at the right lower side of the instrument panel. The conventional automobile driving instruments, including the transmission gear changing handle (gear shift), the brake pedal and the clutch pedal, remain in their conventional positions and perform their usual functions.

The overhead control panel 203 includes many of the instruments and controls necessary for flying. Preferably, it is canted towards the pilot and all controls are located within normal arm's length to avoid any unnecessary body movement. A weather-sealed lockable cover is provided for the control panel-control linkage area, which cover would be set in place under the air structure 11 when the automobile portion 10 is removed.

Figure 5:
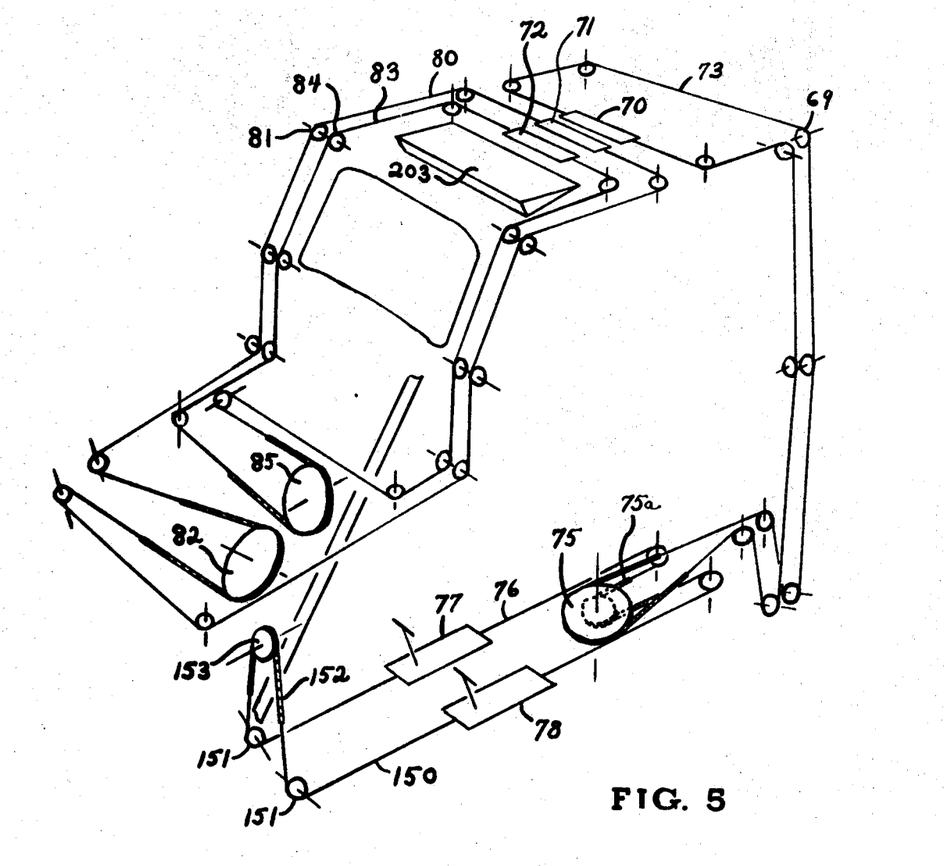
FIG. 5 is a perspective schematic view of the control cables for flying, the cables being within the automobile portion.

The control plates for the rudder, elevator and aileron controls are shown in FIG. 5 and are left to right and right to left in action. The running distance shown for each of the plates, based on a 7-inch plate length, is 10 inches on either side, that is, a total distance of 20 inches of possible sideways movement (allowed by the Volkswagen sun roof opening). A different length of movement may be utilized if it is desired to enlarge the length of the control plates or to make them shorter. Such movement may be increased or decreased by changing the size of the gearing and/or output wheels to which the plates are connected. For example, the rudder-steering pedals, to be described in detail subsequently, may be located further forward, if their mechanical advantage is increased, to provide a lesser distance of movement of the control plate. Location of the rudder-steering pedals further forward will allow greater leg room for the pilot and easier manipulation of the pedals from their most rearward position. In addition, it would also increase the leg room of the passenger sitting behind the pilot.

It will be understood that the instruments and controls mentioned above are those most popularly associated with the flight of light aircraft and that other instruments may be added or certain of the instruments may be omitted.

A schematic representation of the control cables is shown in FIG. 5. The rudder control plate 70 is connected by cable 73 through a set of pulley wheels 69 to a chain which is rotatable with a rudder output sprocket wheel system 75. The rudder output wheel system 75 is rotated by means of chain 75a which is attached to a cable connected to the right rudder-steering pedal 77 and to the left rudder-steering pedal 78.

The elevator control plate 71 is connected to a cable 80 which, by means of a series of rotatable pulleys 81, is connected by means of a chain to a sprocket chain elevator drive output wheel 82. Similarly, the aileron control plate 72 is connected, by means of cable 83 and rotatable pulleys 84, to an aileron output sprocket wheel 85. The aileron output wheel 85 and the elevator output wheel 82, and the steering gear 154 and sprocket wheel 153, are in the front hood area of the automobile portion.

The control plates 70, 71 and 72 join to the overhead control plates and panel which fits within the opening formed by the sun roof of the automobile portion. When driving on the highway the sun roof is normally closed to protect the passengers, but may be opened for increased ventilation or visibility. The sun roof is fully opened when the automobile portion and air structure portion are joined. The control plates of the overhead control panel are connected with the control cables or other drives of the air structure. Each of the control plates 70, 71 and 72 is connected to corresponding plates which are connected to cables in the aircraft portion, the corresponding plates remaining with the aircraft portion upon separation of the two portions.

The connection between the automobile portion and the aircraft portion is preferably effected utilizing the following mechanism. Two tiltable horizontal holding bars (not shown) on the aircraft portion fit in receiving channels 202 on the automobile portion, at the rear top of the car. A spring-loaded rotatable latch (not shown) on the aircraft portion holds the air structure near horizontal, while bolts screw into receiving screw-threaded bores 201 in the front roof of the automobile potion. The side struts 33 and 34 (see FIG. 4), at their bottoms, fit within the jacking ports on the sides of the automobile portions, using spring-loaded pins which are themselves pin locked. A safety cable, using a boat spring, connects the bottom ends of the two struts after they are in position.

The overhead control panel 203 includes the tracks for each of the sideways movable plates (rudder plate, elevator plate, and aileron plate), a master switch, a magneto switch, a tachometer, a trim wheel, a power throttle, a fuel mixture control, carburetor heat control (if appropriate), primer, fuel boost switch and indicator, a flap control, a fuel tank selector, fuel gauges, an oil pressure gauge, an engine temperature gauge, a landing gear control and indicator, controls for each of the required lights, antenna connections, electric cable connections, and a fuse panel, and may contain manifold pressure gauge and propeller control, if appropriate. The panel may also include the handle or other control for an emergency landing gear mechanism for lowering or raising the landing gear, along with a small heater/cooling vent and its controls.

As will be described in detail later, both the aileron output wheel and the elevator output wheel are controlled by the detachable steering wheel.

DETACHABLE STEERING WHEEL

The detachable steering wheel column 92 is illustrated in FIGS. 6, 7, 9, 11 and 12. It comprises a top portion comprising a normal steering wheel 91 fixed to a shaft 92 which rotates and slides within bracket 90, fixed to the dashboard or other automobile structure. The shaft 92 has near its center a plurality of perpendicularly aligned circumferential rack gear teeth 93 which teeth are round in cross section. These gear teeth, when the steering wheel is detached from its normal steering function and moved upward for flight, mesh with a pinion gear 94 so that movement upward and downward along the axis of the shaft 92 will cause the rotation of the pinion gear 94. The rack gear teeth 93 may either be cut into the solid shaft 92 or, alternatively, may be attached thereto as a separate member. The rack gear teeth 93 and the pinion 94 form the elevator control section of the detachable steering wheel shaft.

Figures 6, 8, 9, 10, 11:
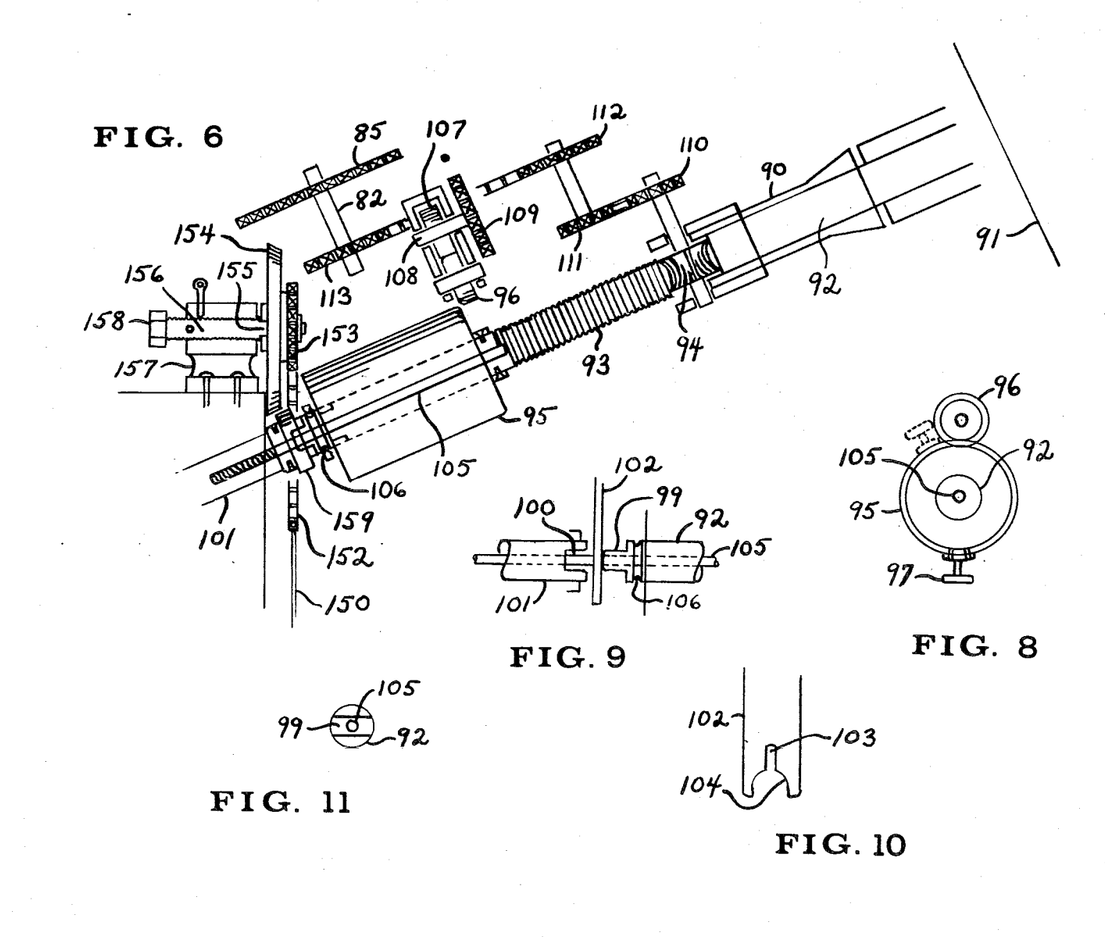
FIG. 6 is a side view of the disconnectable steering wheel shaft shown engaged for normal automobile function.
FIG. 8 is a cross-sectional view of the elongated (drum-shaped) drive gear on the steering wheel shaft in mesh with the aileron gear.
FIG. 9 is a top plan view of a portion of the steering wheel shaft with the tongue inserted, with the aileron and steering controls rotated 90°.
FIG. 10 is a partial front plan view of the insertable tongue for maintaining the steering wheel shaft in flying (or driving) position.
FIG. 11 is a cross-sectional view of the bottom of the top portion of the steering wheel shaft.

Below the rack teeth 93 is an elevated drumlike gear 95 which is affixed to the shaft 92. The drumlike gear 95 with longitudinally aligned gear teeth may be meshed with a gear 96 to form the aileron control. As shown in FIGS. 6 and 8, the rotation of the aileron drive drum 95 is limited by stop member 97 connected to the drum, which acts against the gear 96 which acts as a fixed stop. As shown in FIG. 9, the bottom 99 of the shaft 92 terminates in a locking protrusion which is adapted to fit with the locking groove 100 of the steering shaft 101. When the locking protrusion and locking groove are locked together, the shaft 92 will turn the shaft 101, i.e., the steering shaft will act as a conventional integral steering shaft and will turn the front wheels and the air controls will be disengaged. The shaft 101 is the conventional bottom portion of the steering shaft of the automobile and is connected to the steering linkage for the front wheels. Consequently, when the protrusion 99 is locked in the groove 100, rotation of the shaft 92 will cause the front wheels 39 and 40 to move in the leftward and rightward directions.

A tongue 102 is normally in contact with a circular groove 106 in the steering shaft when the protrusion 99 and groove 100 are interlocked, keeping them in place. The tongue also serves to maintain the shaft portion 92 detached from the shaft portion 101 during flight. The tongue has an upper slot 103 (FIG. 10) which is engaged during flight and a lower larger face 104 which is engaged during driving.

Figure 7:
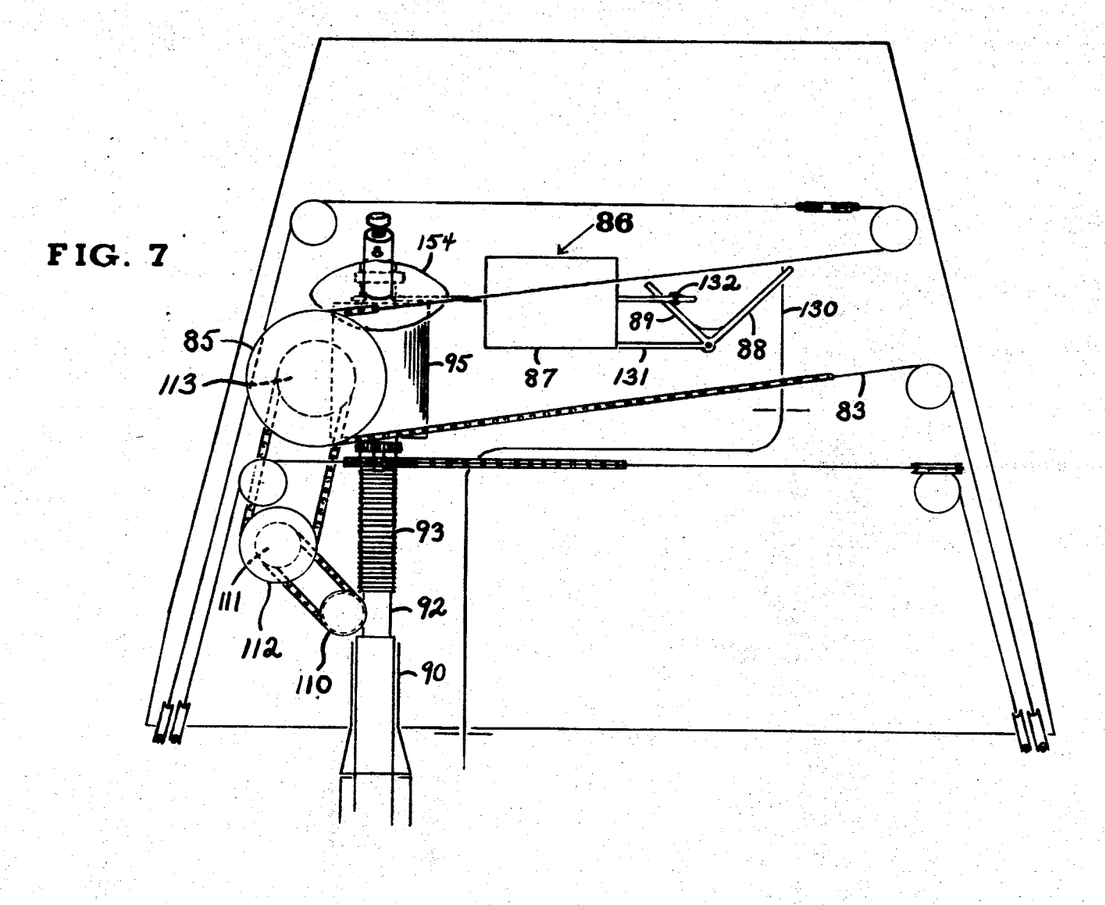
FIG. 7 is a top view of the steering wheel shaft of FIG. 6 shown engaged for normal automobile function, with the aileron control shown at neutral and the elevator control shown full down.
Figure 12:
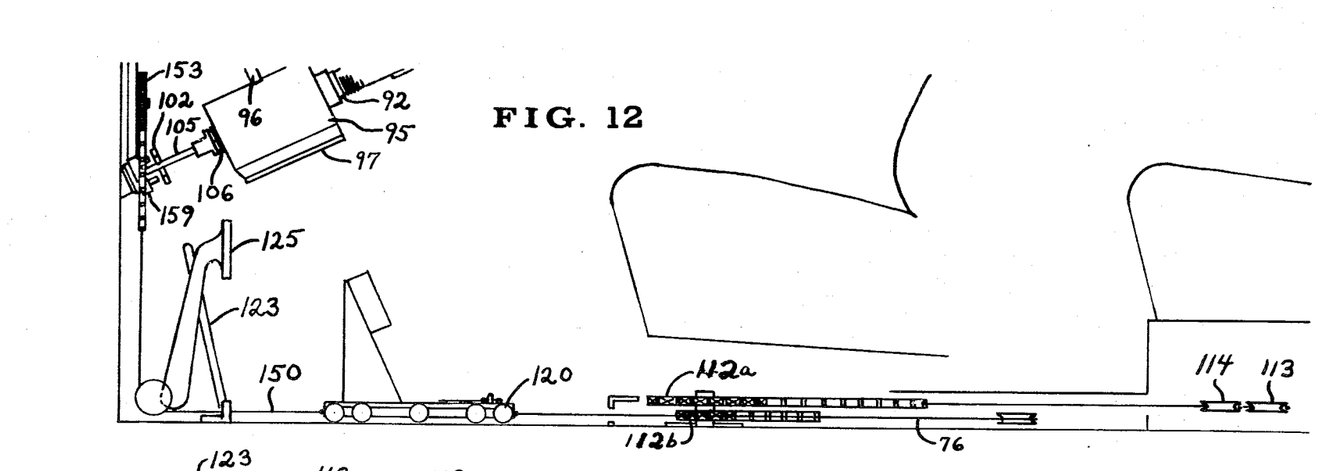
FIG. 12 is a side view of the rudder-steering pedal trolley system.
Figures 13, 14:
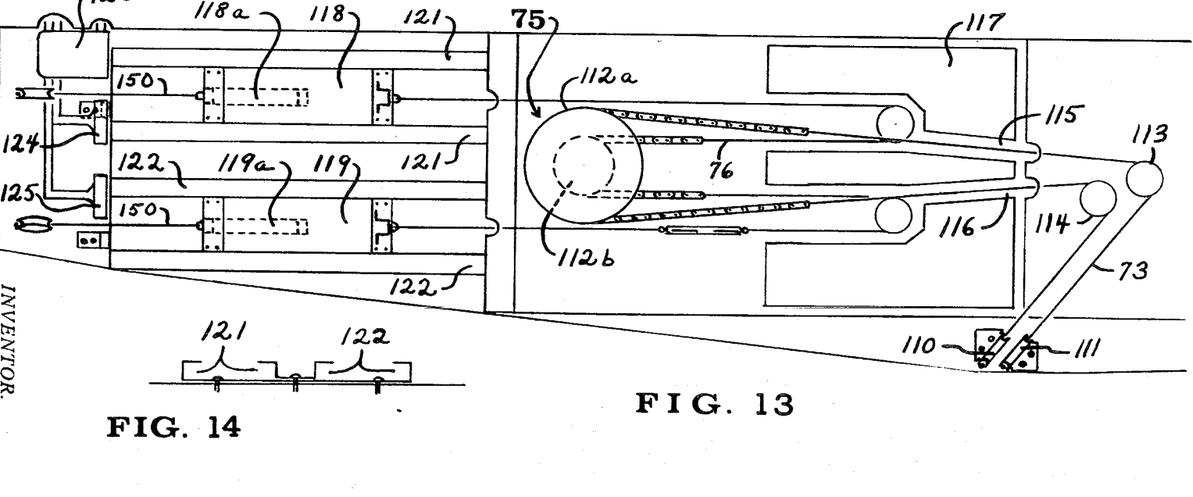
FIG. 13 is a top plan view of the rudder-steering trolley system on the floor of the automobile portion.
FIG. 14 is an end view of the channels within which the trolleys ride.

The tongue 102 is inserted between the shaft portions by means of a positive spring-loaded mechanism 86, shown in FIG. 7. The mechanism 86 includes a case 87 within which the tongue may be withdrawn; a spring (not shown) to load the tongue, and an actuating member having a first lifting arm 88 and a second arm 89, which arms 88 and 89 pivot together, with their pivot being at the top of bracket 131. The arm as may be pulled by hand-operated sheathed flexible cable 130 whose outer end terminates in a knob or handle at the dashboard. The bottom arm 89 acts on a roller 132 pivotally mounted near the top of the tongue 102.

As shown in FIGS. 6, 8, 9 and 11, a central rod 105, which is through the center of the shaft 92 and 101, is arranged to freely slide in shaft 92. That is, the center rod 105 is used to maintain the centering of the shafts 92 and 101 and insure gear engagement and does not communicate rotary motion. The shaft 105 is within the slot 103 of the tongue during flight. During driving on the road, the lower face 104 fits within the groove 106 in the shaft 92.

During normal automobile use, the aileron, elevator system and rudder pedal steering gear are wholly disengaged. The dimensions given below for the various gearings and chain output sprocket wheels are intended as example only. For example, the elevator gearing, which is rack section 93, may comprise 6 linear inches of a round rack section which drives a 1.91-inch diameter gear 94 one full revolution. A sprocket wheel 110, on the same shaft as the aileron gear 94, of 2-inch diameter, will drive, by means of a chain, a steel-formed 2-inch diameter sprocket driving wheel 111. This latter 2-inch diameter sprocket wheel 111 would rotate a 3.18-inch diameter sprocket drive wheel 112 which would deliver a 10 linear inch run of chain to a third spindle 82. Mounted on the third spindle 82 would be a sprocket wheel 113 of 3.18 inches. The third spindle would also carry a sprocket wheel 85 of 6.6 inches having a total linear output of 20 inches.

The aileron gearing would be from the drumlike gear 95 which, with a 4.15-inch diameter, produces 6 linear inches of motion in each direction (right and left), allowing 1 inch for the stop 97. The drum 95, consequently, would drive a 1.91-inch diameter gear 96 one revolution in each direction. The gear in mesh 107 would also be a 1.91-inch gear having on its same spindle 108 a chain sprocket wheel 109 of 3.18-inch diameter. The chain sprocket wheel 109 produces 10 inches of linear motion of a chain in either direction, for a total of 20 inches.

RUDDER AND FRONT WHEEL STEERING CONTROL

The rudder and steering control are shown in FIGS. 13, 14, 15 and FIG. 6. The rudder-steering control is completely separate from, and not connected with, the automobile brake and the automobile clutch. In order to avoid cramping the floor space, the rudder pedals are removable and are stored, for example, under the hood, when the automobile portion 10 is being driven on land.

The rudder control cable 73 is passed under pulleys 110 and 111 at the bottom of the door post. The cable 73 then goes to a pair of pulley wheels 113 and 114 which are generally horizontally aligned. The cables then enter into the rear ends of two openings 115 and 116 in a support block 117. The support block 117 is a block positioned under and behind the front seat to protect the mechanisms. The floor of the car supports freely pivoting chain driven sprockets 112a and 112b, the wheel 112b being fixed to its shaft and generally horizontally aligned. A second wheel 112a, fixed to the same shaft, is also a sprocket wheel and is the rudder output wheel 75. The rudder cable 76, connected to the ends of the chain about wheel 112b, is connected to the rear end of a first trolley 118 and also to the rear end of a second trolley 119. A spring 118a, 119a is positioned in each of the trolleys and connected to the cable 150. That arrangement permits one to move the rudder slightly without moving the front wheels of the automobile portion. This slight rudder movement, without movement of the steering column 90, is found in conventional aircraft and provides a slight start of the rudder on hard turns, for example, when starting from a standstill position on the ground.

Each of the trolleys has freely rotatable wheels 120 aligned along each of their sides. The wheels 120 rotate within a tunnel or channel 121 and 122. The channels 121 and 122 are parallel to each other and enable the trolleys 118 and 119 to move forward and back. The channels 121 and 122 are positioned generally in back (relative to the car front) of the gas pedal 123 and brake 124 and the clutch 125.

A suitable removable pedal would consist of a sole plate connected to, and integral with, a support member fastened to a bottom plate. The bottom plate would have a front beveled tongue and a cover plate affixed near its rear end. The bottom plate (shoe or base plate) would have a keyway in its rear end to operate a movable tongue. The movable tongue may be lifted to permit the securing of the shoe plate to the rudder trolley.

The left and right pedals and the left and right trolleys are identical and interchangeable. The pedals may be removed by reversing the procedure, that is, by removal of the safety loop, retraction of the rear tongue, and lifting out of the pedal assembly. Preferably a cover is placed over the trolleys and their tracks after removal of the pedals so that foreign matter does not fall onto the tracks. Preferably the channels are also covered during use of the trolley system. For example, the front and back of each trolley may be attached to the free end of a cloth window-shade type of roller.

It is desired that the movement of the rudder pedals control the turning of the front wheels of the automobile portion when the vehicle is prepared for flight. However, the coupling between the rudder pedals and front wheels should have some extent of free movement, and for that purpose springs 118a and 119a are provided in the rudder pedals, those springs being connected to the respective pulling cables. As shown in FIG. 5, the front of the rudder pedals 77 and 78 are connected by a cable 150 which turns about pulleys 151 and is connected to the ends of a chain 152. The chain 152 drives sprocket wheel 153.

As shown in FIG. 6, the sprocket wheel 153 is fixed to a toothed gear 154. Wheel 153 and gear 154 rotate freely together about the cylindrical end of shaft 155. The forward portion 156 of the shaft has screw threads which screw within the threaded bore of fixture 157 which is attached to a fixed member of the automobile portion. The shaft 156 may be rotated by its nutlike head 158. Rotation of the head 158, by the user when readying the vehicle for flight, lifts gear 154 into mesh with the gear 158, and a pin is placed in a hole of the shaft 156 to prevent rotation of the shaft. The gear 159 is fixed to the lower portion 101 of the steering wheel shaft; consequently, rotation of the gear 159 will turn the front wheels. The rudder pedals, by rotation of wheel 153, gear 154 and gear 159 will turn the front wheels from stop to stop in correct synchronism, degree and direction with their turning of the rudder.

EMERGENCY POWER SYSTEM

Figures 15, 16:
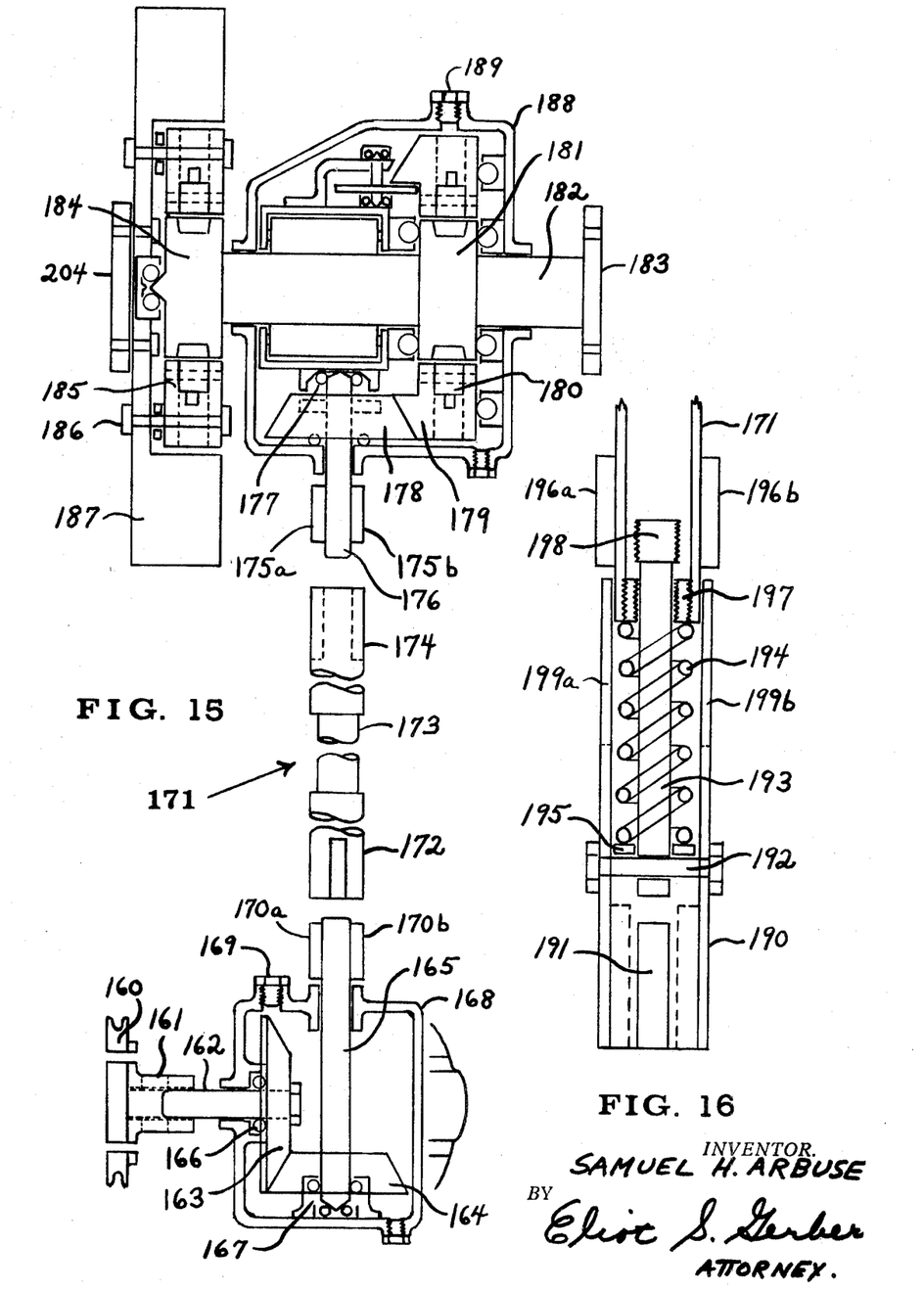
FIG. 15 is a side cross-sectional view of the emergency power takeoff system.
FIG. 16 is a cross-sectional view of the end or attachment portion of the removable power shaft.

The emergency power system is shown in FIGS. 15 and 16. It utilizes the engine in the automobile portion 10 to drive the propeller 22, for example, when the aircraft engine has stopped because of some malfunction.

The engine in a Volkswagen 1970 "Beetle" sedan is an air-cooled engine having about 57 brake horsepower at 4,400r.p.m. That rotative speed, ignoring wind and load factors, would drive the propeller at about 2,500 r.p.m., which may be compared to its normal rotative flying speed. Under the load of flight, even if the propeller should be driven at only 1,500 r.p.m., the automobile engine acting as emergency power will reduce the rate of descent of the aircraft and extend its gliding range, thereby providing an increased measure of safety.

In general, the emergency power mechanism comprises a power takeoff from the automobile engine, a set of power transfer mechanisms and an overrunning clutch. In normal flight, with the aircraft engine operating, the automobile engine is off. The automobile engine is started only if the aircraft engine fails or if additional power is required.

A pulley 160, or plate, is driven by the main shaft of the automobile engine. The bushing portion of the pulley is fixed to a horizontally aligned hollow shaft 161 with keyways, which couples to a keyed solid shaft 162 having a gear 163 fixed at its opposite end. The gear 163 meshes with a gear 164 fixed to a vertically aligned shaft 165. The shafts 162 and 165 run in respective bearings 166 and 167. The gears 163 and 164 are within a case 168 having a closure 169, permitting the case 168 to be filled with lubricant. Two protruding key members 170a and 170b are integral with the top of the shaft 165. The case 168 is connected to the rear of the automobile portion 10 in front of and within its rear bumper.

A removable and extendable shaft 171 connects the gear case 168 to the upper gear case 188. The shaft 171 has two spring-loaded keyway mechanisms, one at its top and one at its bottom, those mechanisms being the same, and one being shown in FIG. 16. The shaft 171 consists of a bottom spring-loaded keyway mechanism 172, a central hollow elongated cylindrical shaft portion 173 and a top spring-loaded keyway mechanism 174.

The top keyway mechanism 174 fits over the protruding keys 175a and 175b of the shaft 176. The shaft 176 rotates in bearings 177 and has a horizontally aligned gear 178 fixed thereto. The gear 178 meshes with the gear 179. The inner diameter portion 180 of gear 179 is the outer member of an overrunning clutch. The inner member of the overrunning clutch 181 is fixed to the propeller shaft 182. In the overrunning clutch, if the propeller shaft is being turned faster by the aircraft engine than the effective speed of the shaft 171, the rotation of shaft 171 would have no effect, i.e., the driven shaft (propeller shaft 182) can run faster than the drive shaft (emergency power shaft 171). A suitable overrunning clutch may be of the friction pawl and ratchet drive type.

The propeller shaft 182 has a flange 183 to which the propeller may be attached, and an end, inner member, of an overrunning clutch member 184. The member 184 cooperates with the outer overrunning clutch member 185, which member 185 is secured by bolts 186 to the output plate 187, which is an augmenting cooling impeller secured to the normal propeller mounting flange 204, of the aircraft engine. When the aircraft engine is stopped with the automobile engine turning, the propeller shaft 182 (because of the overrunning clutch 184, 185) is effectively separated from the output plate 187. Such separation enables the automobile engine to turn the propeller shaft 182 without also turning the shaft of the aircraft engine. The gears 178, 179, and supporting bearings and shaft portions, are within a casing 188 having a closure 189 for the entry of a suitable lubricant.

A suitable spring-loaded key mechanism is shown in FIG. 16. It includes a bottom cylindrical and tubular portion 190 having a keyway slit 191 and a similar slit on the opposite side. A removable bolt and nut 192 is passed through the bottom of the rod 193 to hold the rod in position. A spring 194, by pressure against a washer 195 supported by the bolt 192, urges the tubular shaft 171 upward. A screw-threaded bushing 197 is fixed in shaft 171 and an enlarged screw threaded top 198 is attached to rod 193 to retain the rod within the shaft, the rod being removable for repair by screwing top 198 through the bore of bushing 197. The shaft 171 has bottom key protrusions 196a and 196b which fit within corresponding keyway slots 199a and 199b of tubular portion 190. In operation, the spring 194 is compressed and the keys 170a, 170b, within slots 191, turn the tube 190. That motion is transmitted by the keyway slots 199a, 199b acting upon the keys 196a, 196b.

Modifications may be made in the present invention within the scope of the subjoined claims. For example, although the above-described embodiment relates to the use of a single aircraft engine, the invention may also be applied using two aircraft engines. Such a twin-engine configuration plane will have a flying capability day or night, under most weather conditions, and with maximum safety. The engines are mounted so that their thrust is symmetric via a single propeller, minimizing possible control problems. The major change required, in addition to the added engine, would be an added area of wing.

I claim:

1. A combination land and air vehicle comprising:
an automobile portion including a body, a plurality of wheels and an engine to drive at least one of the wheels;
an air structure portion including a wing, a propeller connected to a shaft, an aircraft engine to drive said propeller shaft, and a tail assembly;
means to removably connect the said two portions; and
an emergency power transmission mechanism including a power transmission means, a mechanism to removably connect the transmission means to the engine of the automobile portion, and overrunning means between the transmission means and the propeller shaft to drive said propeller shaft when the aircraft engine is not driving the said propeller shaft.

2. The combination vehicle as in claim 1 wherein the transmission means is a rotatable shaft.

3. The combination vehicle as in claim 2 wherein the transmission shaft is connected to an overrunning clutch to drive the propeller shaft.

4. A combination vehicle capable of travel on roads and in the air comprising:
an air structure portion including a wing having controllable ailerons; an aircraft engine, and a tail assembly having controllable rudders and an elevator; and a detachable control mechanism to control said surfaces;
an automobile portion including a body, a plurality of wheels including at least one wheel having means for its directional control, an engine to drive at least one of the wheels, and a steering wheel connected to a steering wheel shaft to control said controllable wheel; and means to disconnect said steering wheel shaft from said wheel direction control means;
means to removably connect the said air structure portion and automobile portion; means to removably connect said steering wheel shaft to said aileron and elevator control mechanisms after said shaft has been disconnected from said wheel direction control means; and means to operatively connect said rudders to said wheel direction control means;
whereby in flight said steering wheel controls said aileron and elevator control mechanisms and whereby said rudders and said controllable automobile portion wheel move in synchronism.

5. The combination vehicle as in claim 4 wherein said means to connect said steering wheel shaft to the aileron control mechanism includes an elongated drumlike gear affixed to said steering wheel shaft.

6. A combination vehicle as in claim 4 and also including a locking mechanism to lock said steering wheel shaft in disengagement with said wheel direction control means.

7. A combination vehicle as in claim 6 wherein the steering wheel shaft is joinable and separable across its axis into two portions and the locking mechanism removably protrudes between the two portions when they are separated.

8. A combination vehicle as in claim 7 wherein said locking mechanism is a spring-loaded tongue.

9. A combination land and air vehicle comprising:
an automobile portion including a body, a plurality of wheels and an engine to drive at least one of the wheels; a braking system including a brake pedal, and a rudder control system including two rudder pedals which are removable or foldable so as not to interfere with land driving;
an air structure portion including a wing, an aircraft engine, and a tail assembly including a rudder;
means to removably connect the said two portions;
wherein said automobile body has a top frame supporting a roof opening; the said connection means including at least one pair of mating control panels positioned within the said roof opening.

10. A combination land and air vehicle comprising:
an automobile portion including a body, a plurality of wheels and an engine to drive at least one of the wheels, and a brake system,
an aircraft portion including a wing, an aircraft engine, and a tail assembly including a rudder;
means to removably connect the said two portions;
wherein the automobile portion includes a steering mechanism including a steering wheel and a detachable column for controlling the direction of at least one of said automobile wheels; and
wherein the automobile portion includes two removable or foldable rudder pedals which are removably connectable, upon detachment of the steering column, to simultaneously control the direction of movement of the said controllable automobile wheel and the said rudder.

* * * * *